(12) United States Patent
Roberts et al.

(10) Patent No.: US 12,130,999 B2
(45) Date of Patent: Oct. 29, 2024

(54) USER INTERFACE FOR MULTI-USER APPLICATION WITH HUMAN INTERFACE DEVICES

(71) Applicant: Constructive Labs Inc., Santa Cruz, CA (US)

(72) Inventors: Michael Roberts, Los Gatos, CA (US); Glenn S. Meader, III, Sioux Falls, SD (US); Marco Ferrari, Santa Monica, CA (US)

(73) Assignee: Constructive Labs Inc., Santa Cruz, CA (US)

( * ) Notice: Subject to any disclaimer, the term of this patent is extended or adjusted under 35 U.S.C. 154(b) by 0 days.

(21) Appl. No.: 18/118,106

(22) Filed: Mar. 6, 2023

(65) Prior Publication Data

US 2023/0315248 A1 Oct. 5, 2023

Related U.S. Application Data

(60) Provisional application No. 63/316,850, filed on Mar. 4, 2022.

(51) Int. Cl.
| | |
|---|---|
| *G06F 3/04815* | (2022.01) |
| *G06F 3/01* | (2006.01) |
| *G06F 3/0482* | (2013.01) |
| *G06F 3/04845* | (2022.01) |
| *G06T 19/00* | (2011.01) |

(52) U.S. Cl.
CPC ......... *G06F 3/04815* (2013.01); *G06F 3/017* (2013.01); *G06F 3/0482* (2013.01); *G06F 3/04845* (2013.01); *G06T 19/00* (2013.01); *G06T 2200/24* (2013.01); *G06T 2219/024* (2013.01)

(58) Field of Classification Search
CPC .................................................. G06F 3/04815
USPC .......................................................... 345/156
See application file for complete search history.

(56) References Cited

U.S. PATENT DOCUMENTS

| 10,373,342 B1* | 8/2019 | Perez, III | G06F 3/011 |
| 2018/0075657 A1* | 3/2018 | Lanier | G06F 3/011 |

* cited by examiner

*Primary Examiner* — Long D Pham
(74) *Attorney, Agent, or Firm* — Bochner PLLC; Andrew D. Bochner

(57) ABSTRACT

A method of editing and creating content of a virtual space maintained within a virtual space hosting system is provided. The virtual space hosting system includes a plurality of user devices each of which is connected to one or more human interface devices for displaying the virtual world to a respective user and allowing user gestures by the user to be detected. The method comprises: generating a selection virtual object and, in response to detected user gestures, selecting a virtual object within the virtual space and consequently generating a tool palette virtual object, and, in response to detection of palette interaction gestures from the user, changing the tool palette representation and/or the selected object.

8 Claims, 4 Drawing Sheets

USER INTERFACE FOR MULTI-USER APPLICATION WITH HUMAN INTERFACE DEVICES

RELATED APPLICATIONS

This application is related to:

U.S. Pat. No. 11,074,740 entitled "Shader Editing," by inventor Michael Roberts, issued on 27 Jul. 2021 (hereinafter "U.S. Pat. No. 11,074,740");

U.S. Pat. No. 11,290,572, entitled "System and Method for Facilitating Sharing of Virtual Three-Dimensional Space," by inventor Michael Roberts, filed 16 Feb. 2017 (hereinafter "U.S. Pat. No. 11,290,572") and related European patent No. EP 3 535 733B1 (hereinafter EP 3 535 733 B1") filed 17 Nov. 2017 and also by inventor Michael Roberts and entitled "System and method for facilitating sharing of virtual three-dimensional space";

U.S. Pat. No. 11,595,480 entitled "Server system for processing a virtual space" (hereinafter "U.S. Pat. No. 11,595,480"), filed 23 May 2018 as PCT/IB2018/053639 by inventor Michael Roberts and PCT Application PCT/US23/13999, also by inventor Michael Roberts filed on 27 Feb. 2023 and entitled "Methods and Systems for facilitating the cooperation of large numbers of computing devices with particular application to maintaining, presenting and editing a shared 3-Dimensional virtual space to multiple users" (hereinafter "PCT/US23/13999"), the disclosures of which are herein incorporated by reference in their entirety.

BACKGROUND

One embodiment of the present invention is an application hereinafter referred to as "ConstructiveLabs" or "CL" which is an application which allows the user to make multi-user extended Reality (XR) applications "inside" XR. XR is a term encapsulating Augmented Reality (AR), Virtual Reality (VR), Mixed Reality (MR) and everything in between, as is well known to persons skilled in the art.

In addition to the manipulation of object properties using a "property editor" or "manipulators", the ConstructiveLabs User Interface (UI) also allows the creation of interactive programs by wiring together objects or "nodes", thus enabling events or messages conceptually generated by one object to both call methods and affect the state of other objects.

This base level functionality is enabled by the "ConstuctiveLabs based architecture" described in another series of applications/patents and included by reference above—see especially U.S. Pat. No. 11,290,572.

This application details how version 2 of the tools developed by Constructive Labs both work at the UI level, and also how they interact with the base "metaverse engine" on which CL is built.

MOTIVATION

Figure 1:
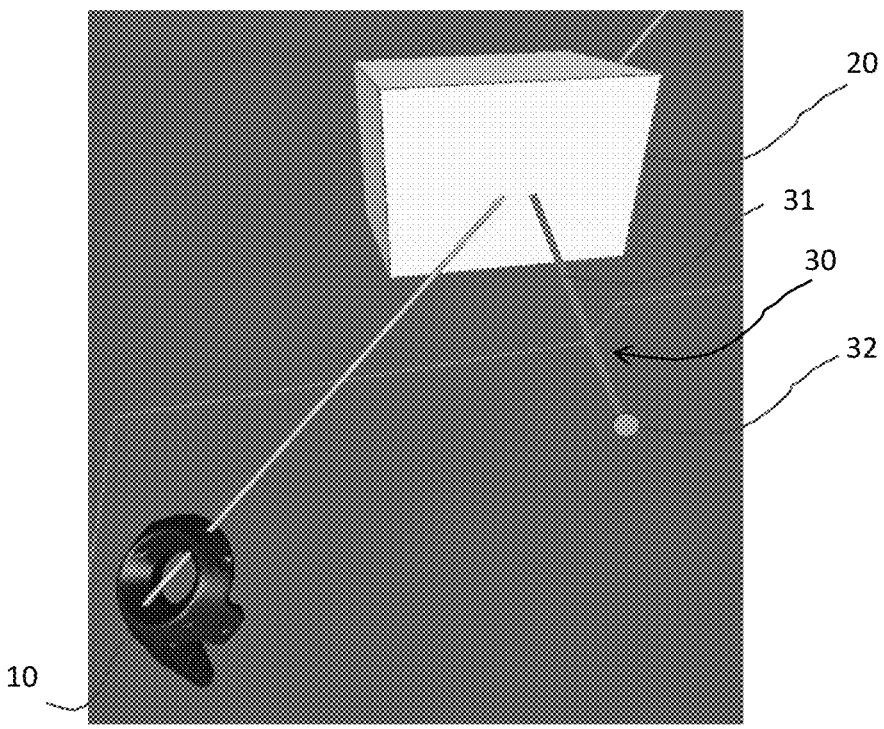
FIG. 1 is an illustration of an embodiment of the user interface.

Constructing XR/VR/AR applications is hard for end-users, and typically involves using an "editor" application (such as Unity3D running on a conventional personal computer).

Using such an application, a user may pick and place objects, change their properties using a property editor, and then "compile" the edit-time representation to a program which is then compiled in turn into a working executable (for example using a C #compiler like Mono-Uinit3D works in this way) and set of associated art resources, shader files, etc. (so as to enable a user to view the objects using appropriate Virtual Reality hardware—e.g. a suitable computer and a virtual reality headset and controllers). This process is usually a single-user process, in that each user works with their own set of tools, and then the these resulting outputs are merged to create the final executable application using a source code control system like git.

In building ConstructiveLabs, the inventors wanted to make "plastic substrate" in which higher level tools could work directly on the "internal runtime system"—drawing from interpreted languages like Smalltalk, the inventors wanted to combine direct manipulation of state with XR, so that users could work in a natural, multi-user and interactive way, with each other. In ConstructiveLabs there is no "edit time" versus "compile time" versus "run time"—it is all the same thing, and the behavior is varied by the sending and receiving of messages between a plurality of objects.

The same underlying principle of the original submission is used to connect "tools" to the "metaverse engine"—the tools, with which the user interacts in VR using a system of "rays", change the state of objects by sending them messages. The exact mechanism used for processing the messages to affect the state of the objects/nodes is out of scope for this application, but is described fully in the above referenced patents and patent applications, the disclosures of which are hereby incorporated in their entirety.

The present invention relates to an apparatus and method for enabling users to edit and create content of a virtual space from within the virtual space.

According to a first aspect of the present invention, there is provided an apparatus for enabling a user to edit and create content of a virtual space comprising:

at least one virtual space hosting device which maintains a virtual space;

one or more human interface devices for displaying the virtual world to the user and allowing user gestures to be detected for providing user input to the virtual space hosting device;

wherein the hosting device is operable to generate a selection virtual object which the user can manipulate using the interface devices in order to select a virtual object within the virtual space, and, in response to the selection of a virtual object, to generate a tool palette virtual object with which the user can interact using gestures recognized by the interface devices, wherein interaction with the tool palette object causes changes to the tool palette representation and/or changes to the selected object.

According to a second aspect of the present invention, there is provided a method of editing and creating content of a virtual space maintained within a virtual space hosting device, which is connected to one or more human interface devices for displaying the virtual world to the user and allowing user gestures to be detected, the method comprising: generating a selection virtual object and, in response to detected user gestures, selecting a virtual object within the virtual space and consequently generating a tool palette virtual object, and, in response to detection of palette interaction gestures from the user, changing the tool palette representation and/or the selected object.

Preferably, the at least one virtual space hosting device comprises a system of interconnected devices which jointly host the virtual space, with multiple copies of the space being hosted in different devices to facilitate multiple users connected to different devices having the illusion of sharing the same virtual space. This is advantageously provided using the methods and techniques described in greater detail in the above referenced patents and patent applications.

The one or more human interface devices may take many different forms. For example, the display could be provided by a head mounted display as well known in the art of virtual reality systems or by other forms of display such as a 360° screen, etc. Similarly, the human interface devices can conveniently include hand-held controllers such as also well known in virtual reality systems, or wearable devices such as gloves, or simply cameras which track the user's movements (in particular the movements of the user's hands), etc.

The selection virtual object may conveniently be a ray (i.e., a straight, thin rod of light) extending a long way in the virtual space, however other objects could be used, for example a representation of a user's hand (or a pointing finger) to permit simple "touching" of the virtual object to be selected.

The tool palette virtual object preferably comprises a plurality of sections or buttons which can be "pressed," preferably by manipulating the selection virtual object (e.g., a selection ray) using recognized gestures from the user (for example pointing the selection ray at the section or button of the palette to be selected and pressing a button on a hand controller). Preferably, at least some of these sections or buttons when activated modify the tool palette object by causing new portions of the tool palette to appear with which the user can also interact (e.g., in a manner similar to that in which "drop down" menus appear when selecting "higher level" menu items within a typical graphical user interface as standard in many normal computer applications). Additionally, interaction with the tool palette may also cause new interactive virtual objects to appear which handle certain types of editing tasks, especially to connect together multiple virtual objects within the virtual space. Preferably virtual objects within the virtual space may be arranged in a hierarchical manner such that a complex object may "contain" a number of "simpler" objects, each of which can further contain yet simpler objects etc. (in a manner analogous to object composition within object-oriented programming paradigms). Thus, an interactive virtual object may be displayed which enables a user to view, navigate, and edit such hierarchical compositions of virtual objects. Similarly, virtual objects may be "linked" to other virtual objects such that a change in one object may cause a predetermined change in another virtual object to which it is linked, and the tool palette virtual object may create another similar interactive virtual object to allow such linkages or "wiring" to be displayed, navigated, and edited, similarly to the composition interactive object.

Most preferably, these additional interactive objects are reference objects (so called because they refer to "visible" objects—i.e. objects which are a part of the shared virtual space with which a user can interact in "play" mode—i.e. where the user is experiencing the shared world rather than editing or creating it—these could of course be rendered invisible (e.g. transparent) or otherwise not-visible (e.g. hidden) to the user in some circumstances, but they are distinct from reference objects which are only visible when in "edit" mode and refer to "visible" objects in order to control the properties or functionality of those "visible" objects. These reference objects are preferably generated and displayed in the virtual space close to the user rather than requiring any (further) direct interaction between the selected object and the user once the originally selected virtual object has been selected.

It is also important to note that these reference objects (described in greater detail below) are nonetheless simply objects like any other so far as the system is concerned (albeit that they are typically only rendered to a user when that user is in edit mode—of course it is quite feasible, and may be convenient in some circumstances, to allow other users to also view these reference objects when one user is viewing them (in edit mode)—for example when a number of users are collaboratively working on editing the shared virtual space—and therefore in a preferred embodiment it is possible for a user to "invite" other users to also view the reference objects while the editing user is in edit mode—indeed, it is also possible, for example, to allow other users to not only view these reference objects but also to directly edit them at the same time—obviously not at exactly the same time but collaboratively during a shared editing session—in other words it is preferable for an initiating user to be able to give "read" and "write" permissions to other users, etc.).

It is also an important preferred feature that one of the reference objects generated during an editing session is one which refers to a selected "visible" (or "play mode") object to enable "wiring" to that object using other reference objects in order to affect the functionality of such object. In a preferred embodiment, such a reference object may take the form of a "stalk" which is connected to the "visible" object and has a "node" (e.g. a small sphere) at the distal end thereof. Such a node can be connected to other "nodes" using "wires" in order to perform visual programming of the visible object. As a simple example, it is possible for a user in an editing mode to create a lamp object which can toggle between an "on" state in which it is luminescent and an "off" state in which it is not luminescent, and then to create a switch object (also a "visible" object with which a user can interact in play mode) which can be pressed by a user in play mode to toggle it between "on" and "off" states, and to "wire" the switch object to the lamp object so that when (in "play mode") a user presses the switch object it causes the lamp object to toggle correspondingly between "on" and "off". Within the system the effect of this "wiring" editing performed by the user is the creation of an edge object connecting the switch object to the lamp object and when a user (in "play mode") toggles the switch a message is generated by the switch object and sent to the light object (via the edge object—in fact the edge object receives the message from the switch object and may then generate a new message to send to the lap object to achieve the same effect as sending the message directly from the switch object to the lamp object) which receives the message and toggles its state accordingly. This process is replicated in any corresponding replica objects in the simulators of other users' computers thus maintaining the illusion of a shared space as described in greater detail in the referenced earlier patents and patent applications.

It is also important to note that reference objects may be purely functional rather than "visible" objects. For example, the user could create a parameter node which merely outputs a parameter and this could also be connected to the reference node of a "visible object". Again, for example, and extending the above light and switch example, a user in edit mode could modify the lamp object to also require an input to set the colour of the light emitted by the lamp when in its "on" state. The user could then generate a parameter node which outputs a parameter which is recognized by the lamp object and sets the emitted light colour of the lamp (e.g. a cold bluish light, a warm yellow light, or coloured light such as red, blue, or green, etc.). This could then be changed in edit mode (since the parameter node is not a "visible" object) by changing the property of the parameter node—which in this very simple example merely outputs a parameter. To connect this node to the lamp object, the (first) "wire"—between the switch object and the lamp object—also preferably has a "node" (again preferably in the form of a small sphere having a slightly larger diameter than the thickness of the wire at its centre point so it is easily visible to the editing user) located at the centre of the wire to which the editing user can connect a second wire (so as to connect from the parameter node to the centre node of the first wire). Alternatively, the editing user could connect the parameter node directly to the "stalk" node of the lamp object. The effect would be the same in that whenever the parameter node is changed (e.g. from "warm white" to "red") a corresponding message is sent from the parameter node to the lamp object, however the former approach might be more appropriate if the user might one day wish to upgrade the switch object to also be switchable to allow users in play mode to change the colour of the light as well as to switch it on or off. The underlying system creates a new object for the parameter node and a corresponding edge object to connect it accordingly so that when a user leaves and then re-enters edit mode the wiring made by the user is recreated and displayed again to the user. This approach for altering the functionality of objects within a virtual space is extremely flexible. A node can be pretty much anything achievable by computer programming and they can be combined together in any sensible manner.

It will be appreciated by a person skilled in the art from the above description that a wire can be used to convert data from one object into a form of data expected by another object. For example, in the above example the Lamp object may "expect" data in the form of various parameters which it needs to operate such as a brightness level, and a colour for the light to be emitted whereas the switch object merely outputs whether it is on or off. The on/off output from the switch object is then converted into an expected input form for the lamp object by setting the brightness and colour parameters accordingly as determined by the wiring). Such a parameter node may be embedded in the central node of the wire such that when an editing user simply clicks on this node the required parameters can be directly set by the editing user within the node. This internal node can be created in the wire based on instructions, from the object to which the wire is connected, as to the form of data that it expects to receive, and rules on forms of data which it can receive if appropriately supplemented with values entered directly to the wire node (for example the lamp object could specify that if the input is an on/off toggle parameter this needs to be supplemented with a colour and brightness parameter provided by the user during editing).

Preferably, the wires have a directionality or flow direction to show which end is connected to an "emitter" node and which is a "receiver" node. Accordingly, the wires preferably have a representation which enable the directionality of the wires to be observed by a user. In a preferred embodiment the wires are cone shaped with the end attached to an "emitter" node being slightly larger in diameter than the end attached to a "receiver" node. In this way a user can readily view the flow direction of data through the system.

In view of the above discussion, it should be easy for the person skilled in the art to appreciate that this system provides many useful features and advantages. In particular it is easy for a user to distinguish "visible" objects from "reference" objects as visible nodes may have a special representation comprising, for example, a "stalk" (which is like a wire but has no directionality—so it may for example be a rod of fixed diameter) with a node at one end which is used for purposes of "wiring-in" the "visible" object to other reference objects (including possibly a corresponding reference object—e.g. a "stalk"—of another "visible" object); on the other hand, pure reference objects may advantageously be represented as a simple node. The representations may take any appropriate visible form (in editing mode) and may affect other nodes in the underlying system by message passing (note that the downstream elements of a wire connection from one object to another can be understood in this way to "listen" to changes on an upstream object to "represent" data in a 3D manner) so adhering to the general paradigm of the present system as described in the reference patents/patent applications. Also, the system of representations may represent a graph of connected nodes and may themselves be a graph object so that the system is fully self-contained. This wiring mechanism also allows the wiring to be in 3D and easy for an editing user to track and move around within the shared virtual reality space. The set of representations may, in certain preferred embodiments, be replaceable and changeable. In this way the representations may show facets of an underlying object (which may be a "visible" object or a reference object such as a complex node which itself may have many wired inputs and/or outputs).

Finally, it should be noted that this approach allows for seamless switching between "play mode" and "editing mode"—no "compile" step is needed and wiring always happens "live". It should also be noted that this wiring approach allows a mix of dataflow and imperative programming. Finally, it should be noted that this approach is all multiuser capable but each user can, in preferred embodiments, have their own set of representations of reference nodes and wires reflecting what they are editing in edit mode, but these can ideally also be selectively sharable with other users to allow them to simultaneously view and/or edit them as well.

When using a virtual "ray" as the selection device, it may be that the user desires to select a virtual object which is located behind another virtual object. There are several ways in which this situation can be handled other than by requiring the user to move within the virtual space until they can achieve a direct line of sight view to the virtual object of interest. For example, where the ray passes through multiple objects the closest object may initially be selectable, but if the user holds the ray steady for a short predetermined period of time, the closest object may be made transparent or invisible and the next object in the ray's path becomes selectable (as well as becoming more clearly visible as the object in front is made transparent or invisible), etc. Additionally, or alternatively, an active gesture of the user (e.g., a double press of a physical button on a hand controller) may cause this behavior to occur (without waiting for it to occur automatically if both mechanisms are used).

What is a Representation?

Central to the editing behavior in ConstuctiveLabs (CL) is the concept of a "Representation".

In CL, a representation is a stand-in for an object, a set of properties on an object, or for the "whole object". It is something like a "normal 2D handle", used for dragging/manipulating object size/position in conventional 2D graphical user interfaces, or a combination of the view and controller pieces from the conventional MVC (model-view-controller) paradigm.

In our VR world, a representation is an object, separate from, but aware of, the original "underlying" object, which allows us to vary the properties of the underlying object in some way, by interacting with it. A key concept in CL is that a Representation (or reference object) is "just another object"—but it is a specialized object which allows us to affect the properties of the ("visible") object it represents when it interacts with it. Objects can have multiple different representations (or reference objects), affecting different sets of properties, or, equally a single representation (or reference object).

Representations (or reference objects) also give "visually manipulable properties" to non-visual objects, such as logic gates, sequencers, etc. When an object is connected into a graph (acting as a node in the graph), representations (or reference objects) show the representation (or reference object) to the user, when they are in an appropriate edit mode.

In the original versions of ConstructiveLabs, representations were made to appear in the scene, close to the object they represented. An elaborate system of "representations on stalks" was developed in order to visually tie representations to the objects they represented. Similarly, the "property editor" displayed when in property editing mode was positioned so as to be proximate to the object for which it was editing properties.

Standing in One Place

After some use of this original UI, we came to understand that a UI which allows the user to stand in a single location in VR and affect a variety of objects from a distance is desirable.

Specifically, we found users spent a lot of time moving and adjusting the position of the objects in VR, and the viewpoint of the user, so that they could clearly interact with the representation-based tools displayed close to them.

Accordingly, in a modified version, a UI in which most representations and property editing operations remain close to the user, with the exception of scale/rotate/translate drag handles used to adjust the scale, rotation, and position of objects respectively, was also developed. This "user centric" UI allows the user to stand in one position and select objects and some representations of objects in the scene to edit using a "controller ray". This is preferably provided in a combined manner such that both mechanisms are accessible to the user at the same time, although in some embodiments only one of these mechanisms is provided to the user at any one time, and most preferably the user can choose whether both mechanisms function at the same time or only one or the other is accessible to the user at any one time.

In the case where both mechanisms are accessible at the same time, preferably miniaturized copies the visible objects are moved into a wiring diagram as miniature versions of the visible object they represent with a "stalk" (as discussed above) although the visible object can also be wired directly by interacting directly with the visible object (which also displays a stalk as per the original version of the user interface (see FIG. 1)).

The Ray

The controller ray is a selection mechanism—the ray emanates from the main controller or hand 10 (The right controller in the case of a right-handed person—and the left controller in the case of a "lefty") and can be moved to intersect with an object, or representation of an object, in the scene. When the ray enters an object, a pre-selection effect (red outline) is applied to the object, indicating that the ray is inside the object (and is the currently selectable object). When the user depresses the controller trigger button, the pointed-to (pre-selected) object is selected. As illustrated in FIG. 1 when a user points the selection ray at an object (the cube 20) is "pre-selected", and is therefore indicated as being selectable, by highlighting the edges of the object (e.g. by changing the colour of such edges). If the user then presses a selection button on the hand controller 10 (a virtual representation of which is shown in the bottom left corner of FIG. 1), the object is selected and a "stalk" 30 is generated with a rod portion 31 and a node 32.

Tool Palette

What happens next depends on the "tool palette mode" which is controlled by a tool palette "attached" (in the virtual space) to the user's secondary controller or hand (the left controller in the case right-handed user). When an object is "selected" in the present embodiment, the tool palette (shown in FIG. 2) becomes visible, but, other than that, the user remains in play mode as indicated by the second from left section "Play mode" being highlighted (i.e. by being shown as green) initially.

The tool palette contains a primary row of several different "QuadButtons" (graphical bitmap buttons with an "Up" (unselected) and "Down" (selected) bitmap. Currently, "up" buttons are coloured orange to indicate they are "off", while down buttons are coloured green, to indicate they are "on").

The primary buttons potentially display a set of secondary "context sensitive" buttons above them. Users can rapidly click through buttons using the controller/ray, switching to the "edit modes" of the system.

The "button modes" are:

Save/Load Mode

Figure 2:
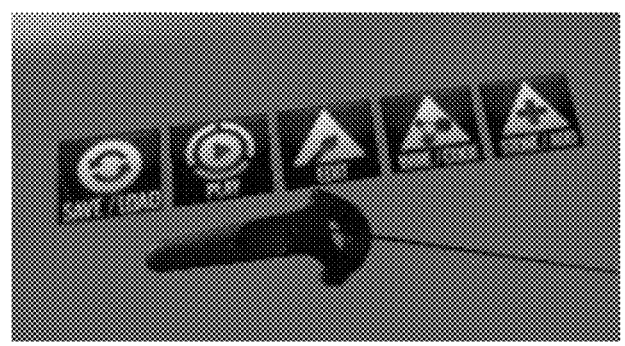
FIG. 2 is an illustration of an embodiment of the tool palette.
Figure 3:
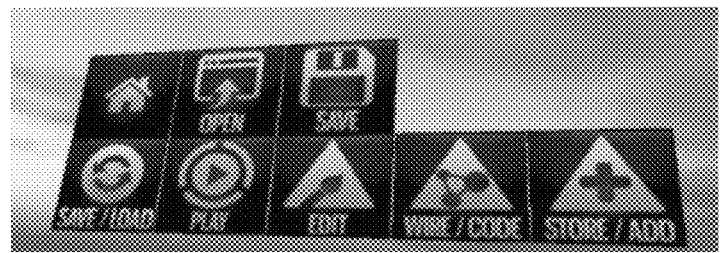
FIG. 3 is an illustration of an embodiment of the tool palette with save/load mode.

Displays a secondary row of buttons above the primary row: the "save load buttons"—enabling the user to save the scene. (See FIG. 3). The save/load buttons are:

Home (top left in FIG. 3)—takes the user "home" to their private "home zone"—a safe place, which cannot be entered by other users without explicit permission Open (top middle in FIG. 3)—Displays an "open dialog" allowing the user to choose a single or multiuser zone to enter Save (top right in FIG. 3)—Saves any changes to the zone/scene to the local disk Play mode (see FIG. 2)

Enters play mode, but does not display a secondary row of buttons

Edit mode (middle button of bottom row of the palette)

Figure 4:
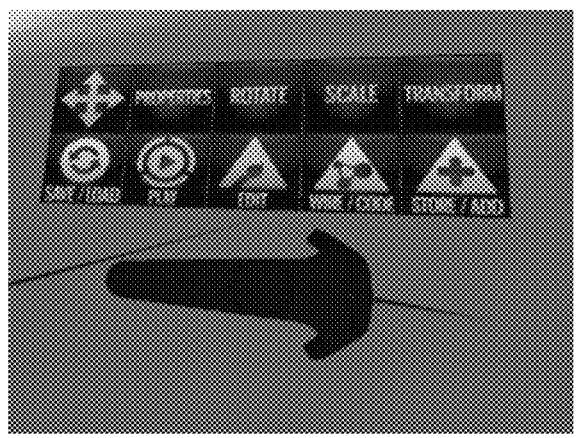
FIG. 4 is an illustration of an embodiment of the tool palette with edit mode.

Enters "edit" mode (note this is a specific edit mode and not exactly the same as the general edit mode as discussed above since the Wire/Code button also enters what one can consider as an edit mode within the more general meaning of edit mode as discussed above), and displays the 5 secondary edit mode buttons. This mode allows the user to scale/rotate/translate objects (see FIG. 4).

Free move (arrows button top left of FIG. 4))—the user, using the ray and controller, can simultaneously rotate, and translate the position of a rayed (selected) object using the controller. Moving and twisting the controller causes the selected object to appear to move within the scene.

Figure 5:
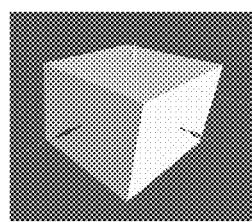
FIG. 5 is an illustration of an embodiment of the positional axis object adjustment screen.

Translate (Transform top right button in FIG. 4)—the user can adjust the position of the object in the 3 positional axes of the object using the colored arrows that represent the axes of the object's position (see FIG. 5).

Figure 6:
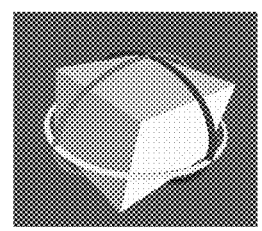
FIG. 6 is an illustration of an embodiment of the pitch, roll and yaw object adjustment screen.

Rotate (top middle button of FIG. 4)—the user can rotate the object by dragging the colored circles that represent the pitch, roll and yaw axes of the object (see FIG. 6).

Figure 7:
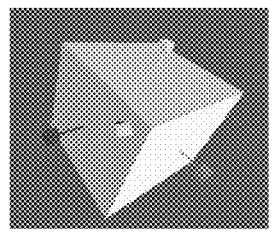
FIG. 7 is an illustration of an embodiment of scale object adjustment screen.

Scale (second from right in top row of FIG. 4)—the user can scale (resize) the object in any of the 3 X, Y or Z axes by dragging the colored handles. An additional yellow handle may be dragged to change all 3 axes simultaneously (see FIG. 7).

Properties—displays an editable property window for the selected object. The user can change the properties. (see Property Editor section, below)

Figure 8:
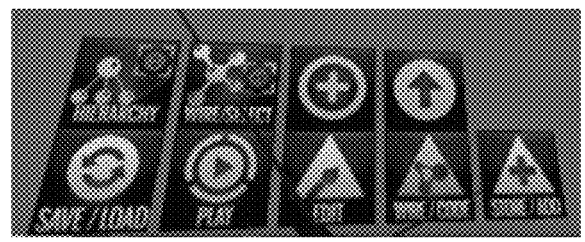
FIG. 8 is an illustration of an embodiment of the tool palette with wire/code mode.

Wire/Code mode (see FIG. 8—the second button from the left on the top row)).

Enters "wire" mode (which is actually an edit mode within the meaning as discussed above) and displays the wiring buttons (see FIG. 8).

Figure 9:
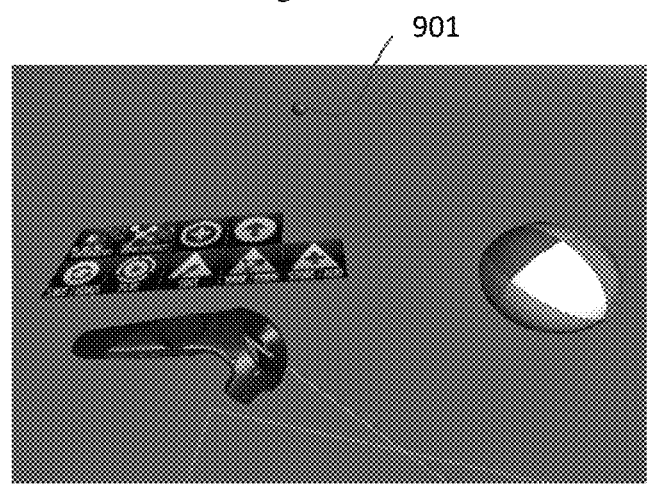
FIG. 9 is an illustration of an embodiment of the tool palette with a node selection capability.

The wiring looks like dark green balls connected by green lines, sort of like a chemistry molecular model (see FIG. 9 noting that the beach ball object only contains a single node (901) which is not yet connected to any other object by wires so is shown as a single node 901).

Figure 10:
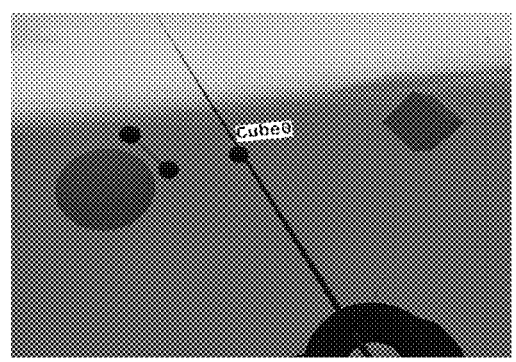
FIG. 10 is an illustration of an embodiment of the user interface after selecting a node.

When one of the nodes is selected, a label appears as shown in FIG. 10 where the node 901 is selected and a label appears to show that it is representing "Cube0" corresponding to the beachball seen in FIG. 9.

When there are multiple objects wired together, this view shows a "connection graph"—the selected object is shown in the center of the graph—objects with to/from connections are arranged around the outside of the representation—to several levels deep. Users can thus click around in the scene and see "what is connected to what" while standing in one place. Like Hierarchy, the graph is shown above the tool palette.

Figure 11:
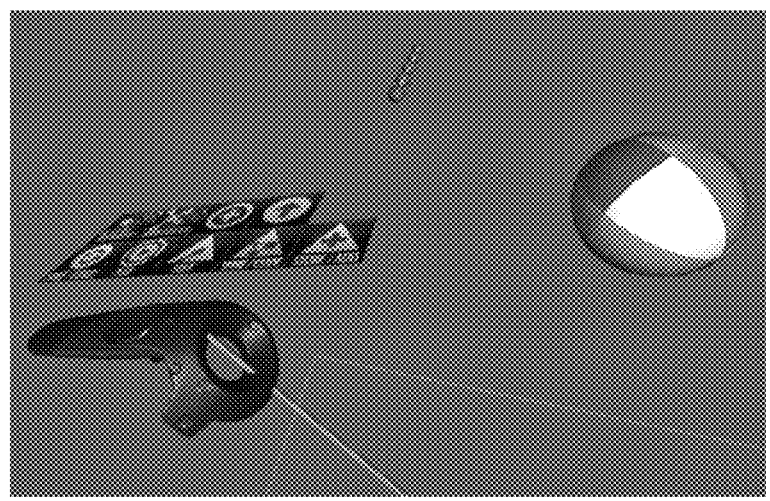
FIG. 11 is an illustration of an embodiment of the user interface including a scene graph.

Hierarchy (see FIG. 11—entered by selecting the top left hand button of the palette when the wire/code button is active)—displays a "scene graph" of representations of objects in the scene with the root of the scene at the top, progressing down to the selected objects and its nearby neighbors above the tool palette. Connections can be moved, rearranging the scene graph hierarchy Plus button (the third button from the left on thetop row of FIG. 8)—any selected object is "added" to the view, either hierarchy or wire/select, so that objects which need to be connected are added as needed.

Up button (the rightmost top button of FIG. 8)—this moves "up a level". For example, if our focus is an object contained by another object, clicking this button will move the focus up a level to the containing object. This allows users to work with complex hierarchies of objects.

Store/Add Mode

Displays an Object Browser window, that contains a hierarchical menu of objects which can be added to the scene. The user highlights the desired item and clicks the Ok button to cause the object to be added to the scene. The Object Browser window disappears.

Figure 12:
FIG. 12 is an illustration of an embodiment of the property editor window.

Property Editor (See FIG. 12)

When in Properties mode (see second button from the left, top row of FIG. 4), as an object in the scene is selected with the ray, a Property Editor window is displayed. This window shows a form detailing the properties of the object. This form works like an ordinary online form. A title is displayed to the left of each property, and a way to enter a value for that property is shown on the right. That value is shown and altered in a text field, a numeric field, a checkbox, or a button that displays a chooser for a color or a file name.

The invention claimed is:

1. An apparatus for enabling a user to edit and create content of a virtual space comprising:
   at least one virtual space hosting device which maintains a virtual space;
   one or more human interface devices for displaying the virtual world to the user and allowing user gestures to be detected for providing user input to the virtual space hosting device;
   wherein the hosting device is operable to generate a selection virtual object which the user can manipulate using the interface devices in order to select a virtual object within the virtual space, and, in response to the selection of a virtual object, to generate a tool palette virtual object with which the user can interact using gestures recognized by the interface devices, wherein interaction with the tool palette object causes changes to the tool palette representation and/or changes to the selected object; wherein
   interaction with the tool palette causes new interactive virtual objects to appear which handle certain types of editing tasks, wherein the new interactive virtual objects comprise reference objects which refer to objects within the shared virtual space and which affect the functionality of those objects but which do not form a part of the set of objects which a user experiences when experiencing the shared virtual world in a mode other than an editing mode, wherein an editing mode is a mode in which the shared virtual world is modifiable by a user; wherein
   all of the objects, both experiential objects and reference objects, are objects which interact with each other by passing messages from one object to another; and wherein
   reference objects can be wired together using wire objects generated in response to user-recognized gestures.

2. An apparatus according to claim 1 in which the apparatus comprises a plurality of interconnected devices which cooperate to host the shared space, with multiple versions of the shared space being hosted in the respective devices and at least some of which are client devices which include software and hardware for enabling respective users to view and/or edit the shared virtual space.

3. A method of enabling a user to edit and/or create content of a virtual space maintained within a virtual space hosting device, which virtual space hosting device is connected to one or more human interface devices for displaying the virtual world to the user and allowing user gestures by the user to be detected, the method comprising: generating a selection virtual object and, in response to detected user gestures, selecting a virtual object within the virtual space and consequently generating a tool palette virtual object, and, in response to detection of palette interaction gestures from the user, changing the tool palette representation and/or the selected object; wherein interaction with the tool palette causes new interactive virtual objects to appear which handle certain types of editing tasks, wherein the new interactive virtual objects comprise reference objects which refer to objects within the shared virtual space and which affect the functionality of those objects but which do not form a part of the set of objects which a user experiences when experiencing the shared virtual world in a mode other than an editing mode, wherein an editing mode is a mode in which the shared virtual world is modifiable by a user; wherein all of the objects, both experiential objects and reference objects, are objects which interact with each other by passing messages from one object to another; and wherein reference objects can be wired together using wire objects generated in response to user-recognized gestures.

4. The method of claim 3 wherein the tool palette virtual object preferably comprises a plurality of sections or buttons, which can be activated by manipulating the selection virtual object using recognized gestures from the user.

5. The method of claim 4 wherein at least some of these sections or buttons when activated modify the tool palette object by causing new portions of the tool palette to appear with which the user can also interact.

6. The method according to claim 5 wherein the wire objects indicate a directionality specifying the direction in which messages flow from an emitter object connected to an upstream end of the wire object to a receiver object connected to a downstream end of the wire object.

7. The method of claim 6 wherein reference objects directly referring to an experiential object are visually distinguishable from other reference objects.

8. The method of claim 3 wherein editing or creation changes to the virtual space made by a user are made in real time such that the changes occur in real time for all users of the shared space without requiring a compiling step to implement the changes.

\* \* \* \* \*